April 27, 1965   W. B. HUCKABAY ETAL   3,181,146
POSITION DETERMINING SYSTEM
Filed Oct. 23, 1961
13 Sheets-Sheet 1

INVENTORS
WILLIAM B. HUCKABAY &
WILLIAM H. PARKER
BY.
Dunlap, Laney & Hubbard
ATTORNEYS

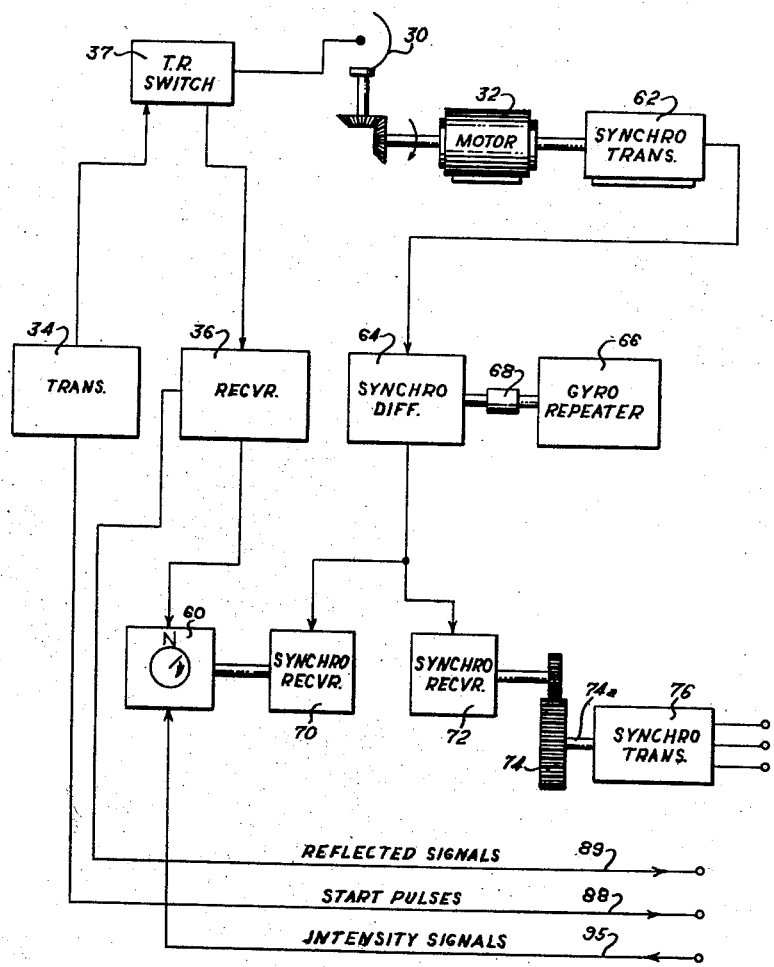

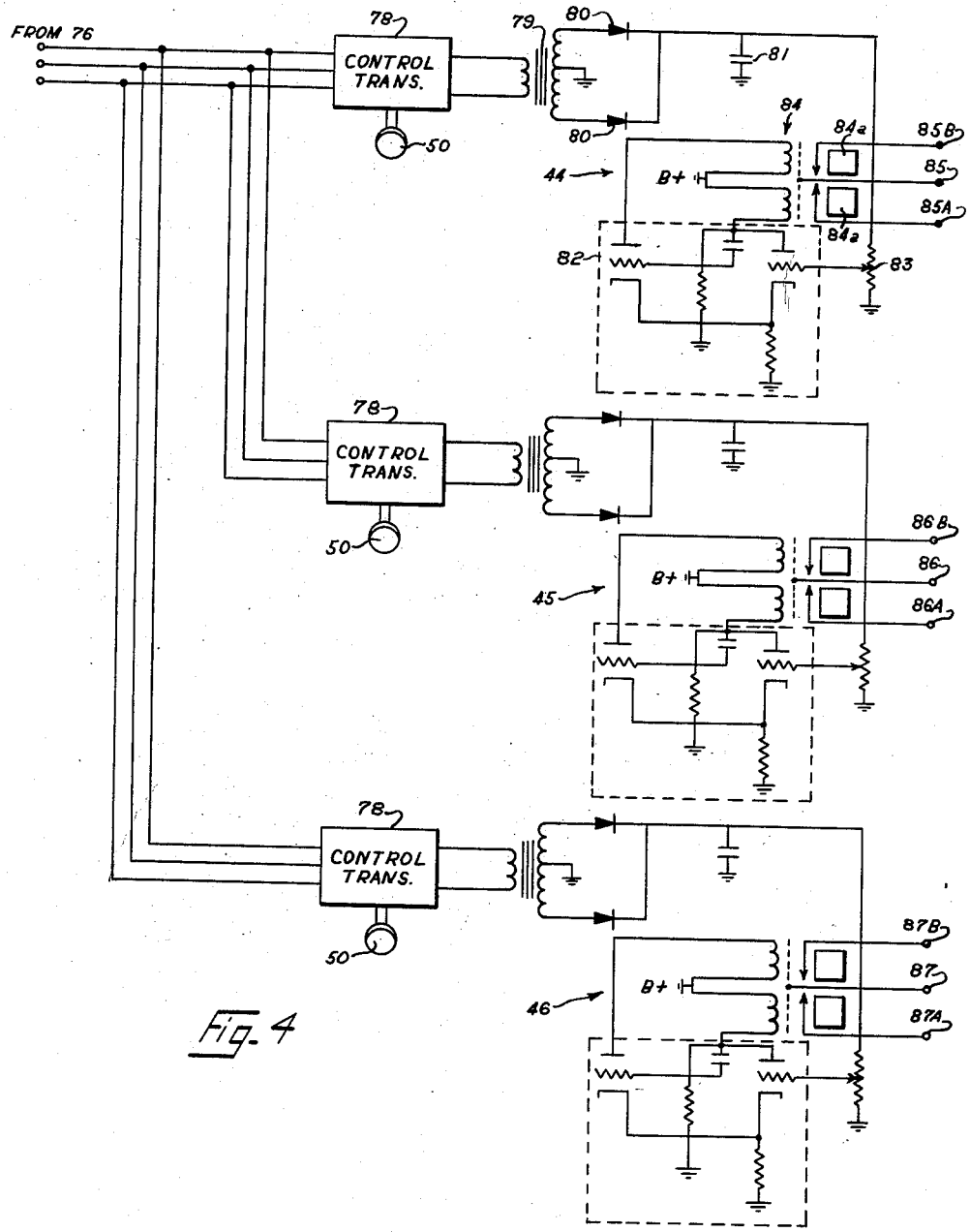

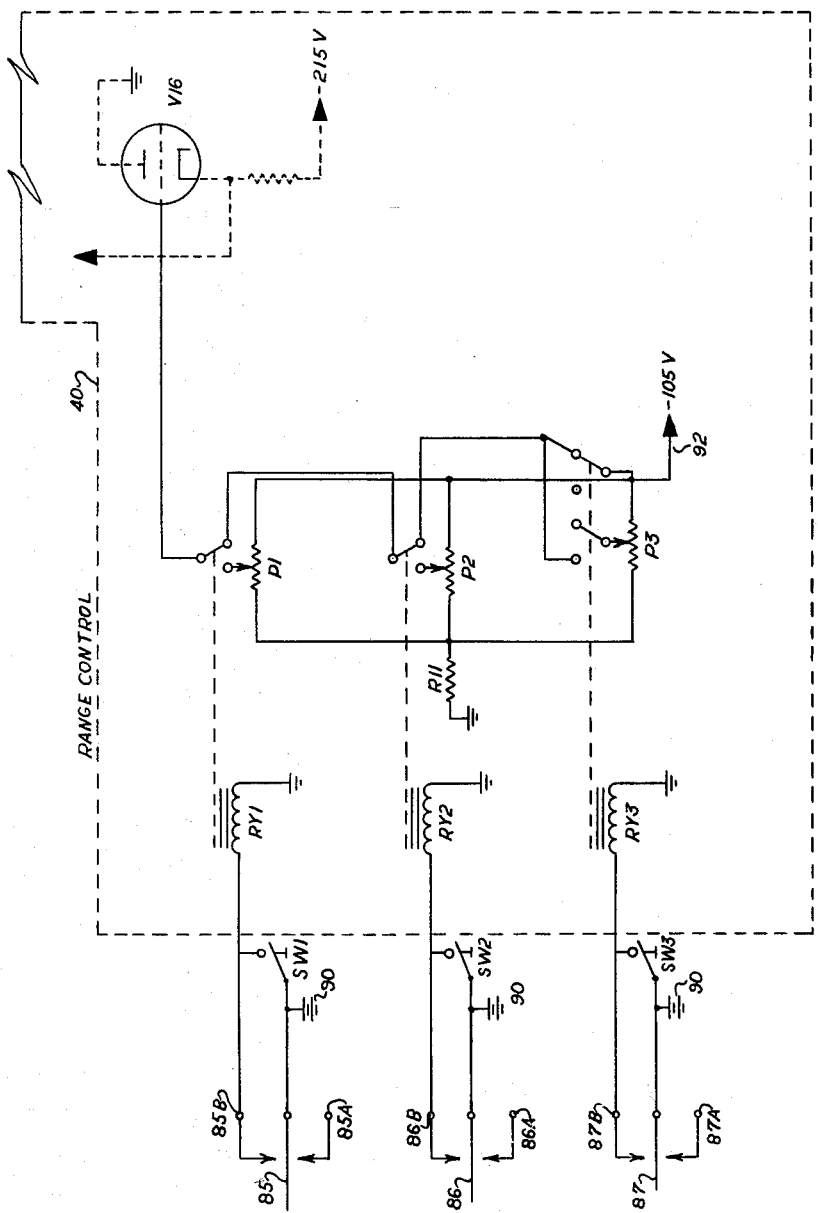

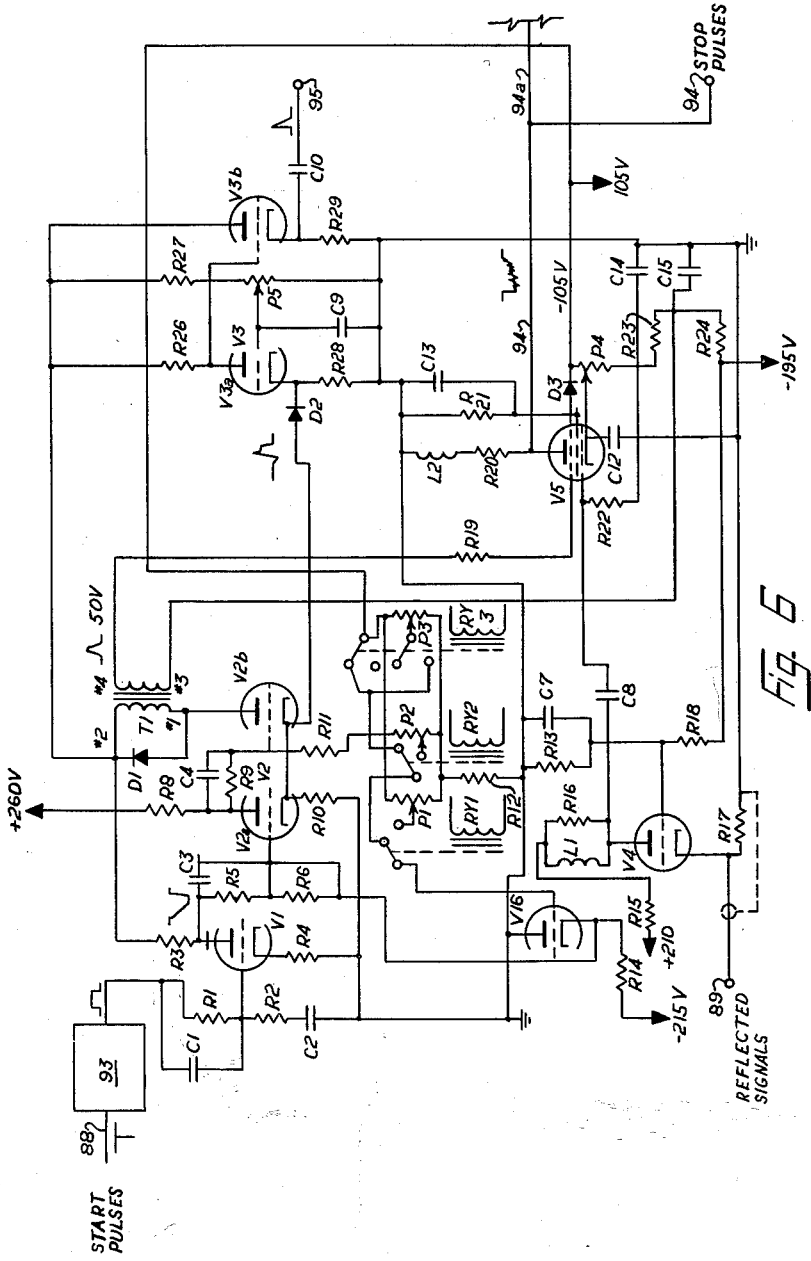

April 27, 1965

W. B. HUCKABAY ETAL 3,181,146

POSITION DETERMINING SYSTEM

Filed Oct. 23, 1961

INVENTORS
WILLIAM B. HUCKABAY &
WILLIAM H. PARKER
BY

Dunlap, Laney & Hubbard
ATTORNEYS

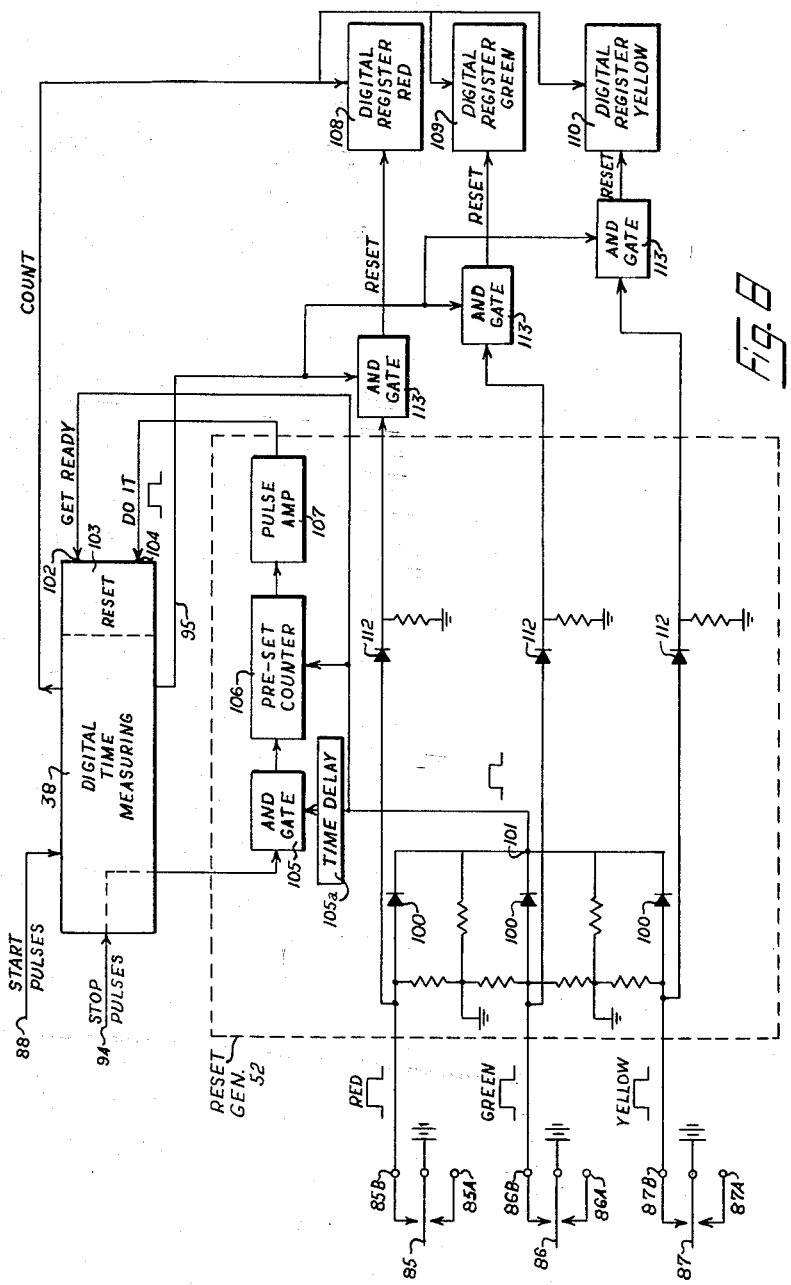

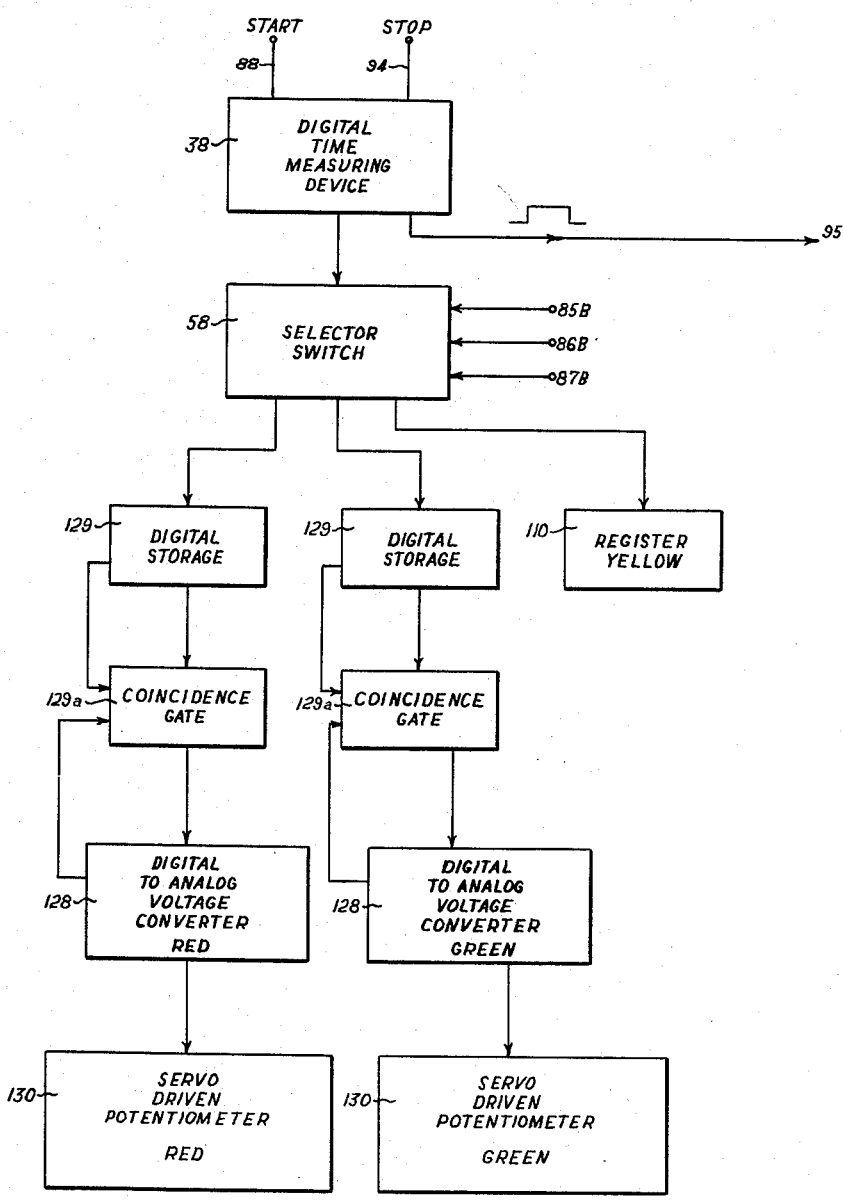

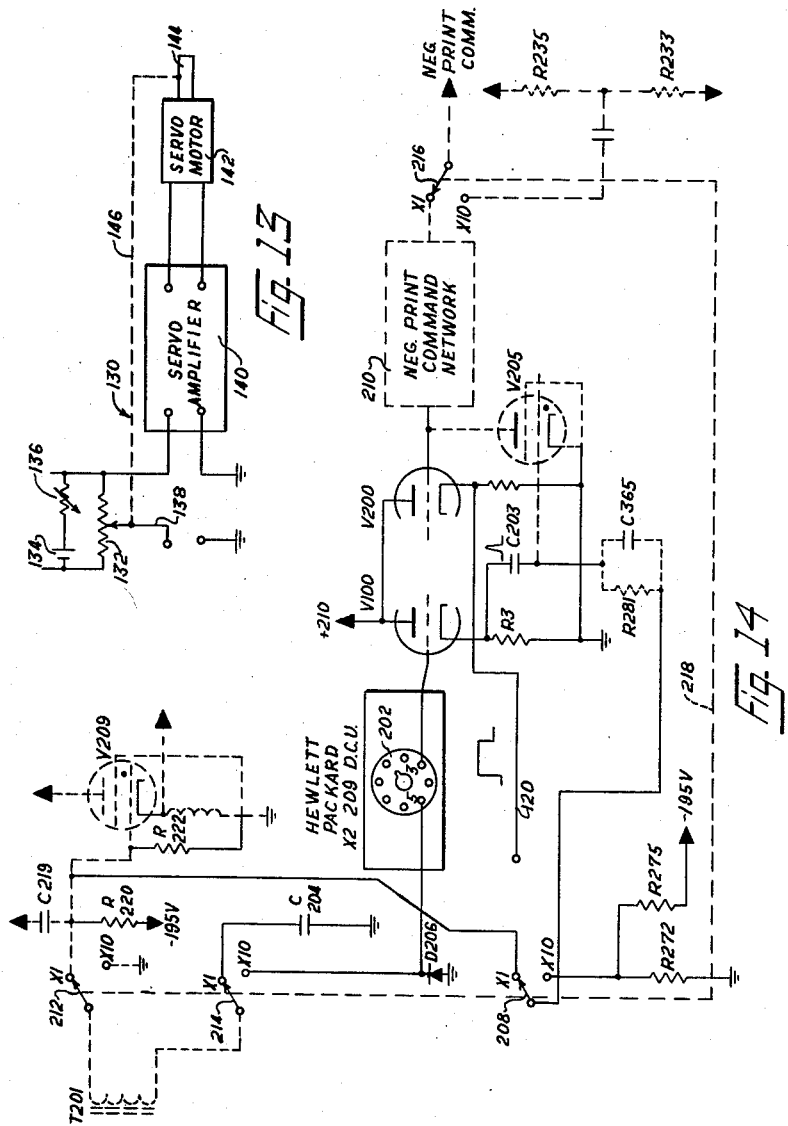

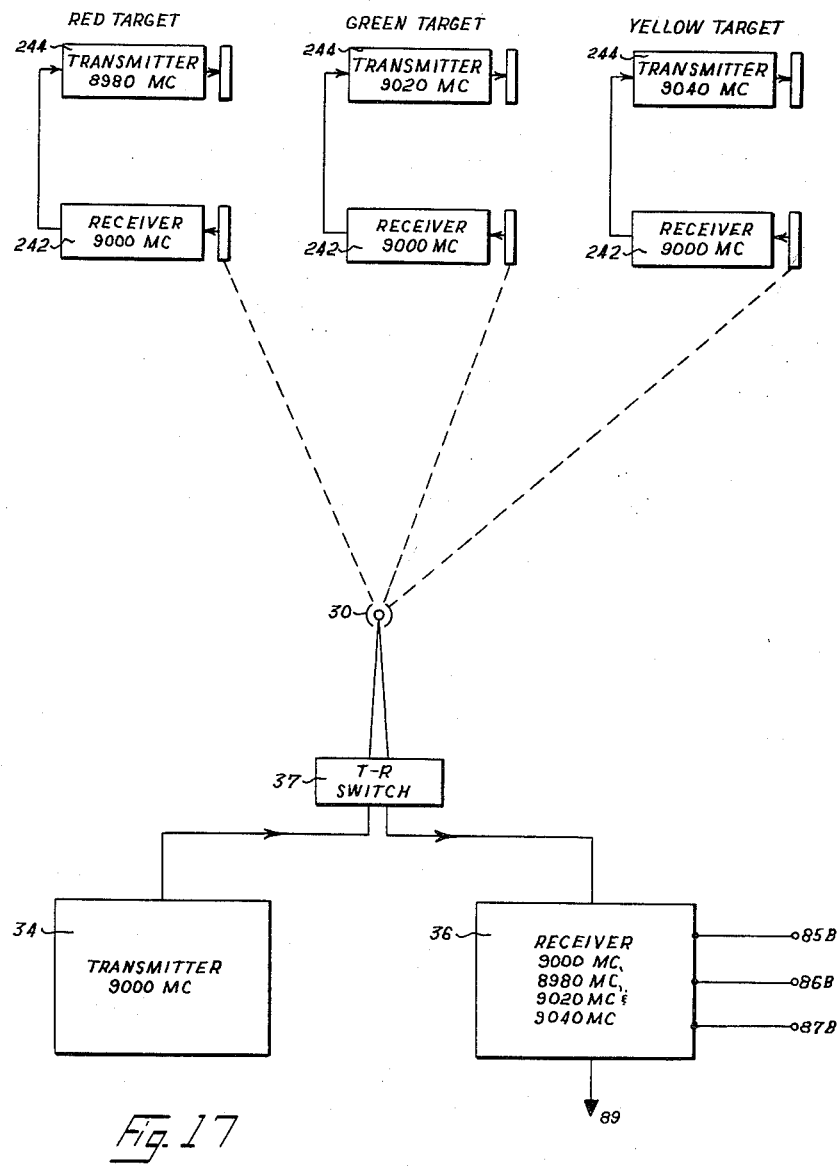

United States Patent Office 3,181,146
Patented Apr. 27, 1965

3,181,146
POSITION DETERMINING SYSTEM
William B. Huckabay and William H. Parker, Dallas,
Tex., assignors, by mesne assignments, to Rayflex Exploration Company, Dallas, Tex., a corporation of Texas
Filed Oct. 23, 1961, Ser. No. 146,848
12 Claims. (Cl. 343—7)

This invention relates generally to improvements in the art of determining the position of a station which, for example, may be on land, on the sea, or in the air, and more particularly, but not by way of limitation, to a novel system for continuously determining the position of a surveying ship used in marine seismic operations.

The system described and claimed herein is an improvement of the system described and claimed in applicants' co-pending application entitled "Position Determining System," Serial No. 839,353, filed September 11, 1959.

As it is well-known in the exploration division of the oil industry, there has been a substantial amount of exploration activity in recent years directed toward locating potential oil deposits underlying the ocean, and particularly in areas adjacent the shoreline of the United States. One of the most important exploration tools is the use of the seismic technique wherein energy sources, such as dynamite, are detonated in the water and the resulting seismic waves reflected by strata underlying the water are received by suitable detectors in the water to obtain an indication of the structure of the substrata. In a typical marine seismic operation, the seismic energy sources and the detectors are towed by a surveying ship, and seismic signals are alternately transmitted through the water and received by the detectors as the ship is navigated along a predetermined course, such that the resulting seismic records may be correlated with other records taken in the immediate vicinity. In other words, if the precise position of the surveying ship is not known each time a seismic record is made, the records taken in a locality cannot be correctly correlated, and the structure of the substrata underlying any appreciable portion of the ocean cannot be correctly analyzed. As a result, many prior efforts have been made to determine and record or plot the various positions of a seismic surveying ship during a survey.

Many prior workers in the art have devised radio types of navigation systems for tracking the surveying ship, but in all of these systems a substantial amount of intricate and expensive equipment is required and the results obtained are not as precise as is desired. Many of the surveying ships also utilize radar for continuously determining the position of the ship by taking distance and azimuth measurements visually from the PPI indicator of the radar and plotting this information on a suitable map. However, and as it is well-known, the measurements of distance and azimuth which may be visually observed on a PPI indicator are only approximate, and the precise position of the ship cannot be obtained in this manner.

The travel time of signals transmitted from a radar antenna and reflected back to the radar antenna by available targets does provide an accurate indication of the distance of the ship from the reflecting targets. However, prior to applicants' system, these signals could not be fed through a precise time-measuring means since signals are reflected from any targets within the range of the radar, and the only means for distinguishing between the various reflected signals has been by the use of the PPI indicator wherein the operator may visually select which targets are being utilized for distance measurements.

The present invention contemplates a novel system for determining the position of a surveying ship wherein the precise distance of the ship from a pair of spaced targets (preferably located on shore) is substantially continuously measured, such that the two distance measurements may be utilized to precisely plot the position of the ship on a map of the area. It will be apparent that the precise position of the targets must be known and this requirement may be easily satisfied by locating special targets along the shore and plotting their positions on a map of the area. The precise position of a target to be used may also be determined by correlating the position thereof with respect to the positions of two other known targets and the ship, such that a series of targets in an area may be used as the surveying ship moves in and out of range of the various targets; it being understood that only two targets are required to be used at any particular time. The distance measurements are obtained by alternately transmitting pulse-type signals toward the known targets and precisely measuring the travel times of the signals reflected only from the targets. Since the velocity of the signals through air is known, the distance of the ship from the targets may be precisely determined from the travel times of the signals.

The present invention may be broadly defined as a system for determining the position of a station with respect to a pair of spaced targets, comprising means for determining the approximate range and direction of the targets from the station, means for alternately transmitting a series of pulse-type signals from the station towards each of the targets and for receiving those signals reflected to the station, time-measuring means, means for starting the time-measuring means simultaneously with the transmission of one of said signals of each series, means for stopping the time-measuring means upon the receipt at the station of a reflected signal of the respective series of signals which arrives at the station at a time spaced from the respective starting of the time-measuring means corresponding to approximately twice the expected travel time of a signal between the station and the respective target, and means for registering the time measurement of the time-measuring means, from which the precise position of the station with respect to the targets may be determined.

In one embodiment of the present invention we utilize the transmitter and receiver portions of a radar system for alternately transmitting pulse-type signals towards the targets and receiving the signals reflected from the targets. A time-measuring means in the nature of a stop watch is combined with the transmitter and receiver portion of the radar system for measuring the time between the transmission of a signal towards one of the targets and the receipt of the signal reflected from the respective target. In this connection it may also be noted that the time-measuring means is combined with the transmitter and receiver portion of the radar system in such a manner that only those signals reflected to the antenna from the immediate vicinity of the desired targets are utilized in the time measurements. In other words, the present system ignores all signals reflected to the transmitting station from unknown or undesired targets, such that the time measurements are taken only with respect to the signals reflected from the desired targets.

Furthermore, the present invention contemplates the averaging of several time measurements during the time the antenna of the transmitter and receiving system is directed towards each of the targets, such that the maximum accuracy in the time measurements is obtained, and hence the maximum accuracy in the position of the transmitting station is obtained.

The present invention also contemplates means for easily widening or decreasing the width of the area scanned at each target to obtain the desired precision while minimizing the attention required by the operator of the system, as well as means for the elimination of temporary targets in the vicinity of the desired target (such as birds, seaplanes, or the like) to increase the reliability of the system.

An important object of this invention is to improve the efficiency and accuracy of marine seismic surveys.

Another, and more general, object of this invention is to accurately determine the position of a station which may be located either on land, on water, or in the air.

Another object of this invention is to accurately determine the position of a station with respect to two known targets spaced at various directions and distances from the station, wherein the precise distance of the station from each of the targets is measured, from which the precise position of the station may be determined.

A further object of this invention is to accurately measure the travel time of a signal transmitted from a station to a particular target and reflected by the target back to the station, even though various unknown targets or undesired targets are located in the general vicinity of the desired target and are reflecting signals back to the station at the same time as the desired target.

Another object of this invention is to provide a system for continuously determining the position of a ship wherein the system utilizes a large portion of the naviagtion equipment normally existing on the ship. More specifically, an object of this invention is to utilize the transmitter and receiver portion of a radar system installed aboard a ship for transmitting and receiving signals which are utilized in the system for time measurements, from which distance measurements may be determined.

Another object of this invention is to automatically obtain an average of several signal travel times between a station and a known reflecting target, such that an accurate time measurement may be obtained.

A further object of this invention is to eliminate temporary targets in the vicinity of desired targets in a position determining system using reflected signals.

A still further object of this invention is to provide a novel system for determining the position of a station with respect to a pair of spaced targets which is simple in construction, which may be easily and economically operated, and which may be economically manufactured.

Other objects and advantages of the invention will be evident from the following detailed description, when read in conjunction with the accompanying drawings which illustrate our invention.

In the drawings:

FIGURE 3 is a more detailed schematic illustration of a portion of the preferred system applied to marine seismic surveys.

FIGURE 4 is a wiring diagram of the azimuth selectors used to adjust and control the directions from which usable reflections are received.

FIGURE 5 is a wiring diagram showing the connections of the azimuth selectors to the range control device.

FIGURE 6 is a wiring diagram of the major portion of the range control device.

FIGURE 8 is a wiring diagram of the reset generator.

FIGURES 11 and 12 are illustrations of alternate embodiments for controlling the registration of the time measurements.

FIGURE 13 is a wiring diagram of a portion of the preferred registering means.

FIGURE 14 is a wiring diagram of the modifications of a time-measuring device to obtain an average of several travel time measurements.

FIGURE 17 is a schematic illustration of a receiving and retransmitting system which may be used in the present position determining system.

Figure 1:
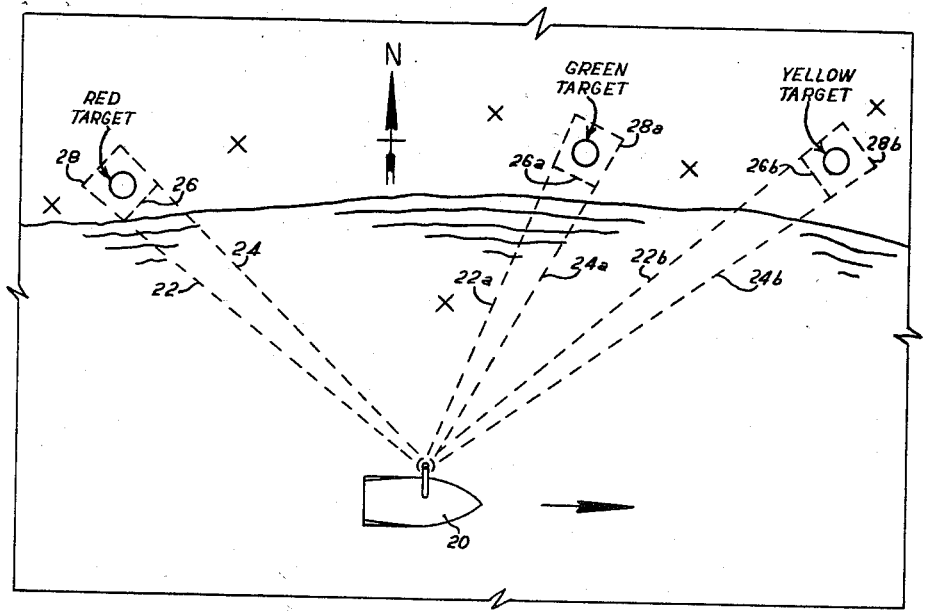
FIGURE 1 is a schematic drawing in the nature of a map illustrating one use of the present invention.

Before proceeding with a detailed description of a preferred embodiment of the present invention, reference should first be made to FIG. 1, which illustrates some of the problems involved in determining the position of a seismic surveying ship 20 utilizing the transmission of signals from the ship and the reflection of these signals back to the ship, particularly when the ship is being navigated adjacent a shoreline. In the present system, the precise positions of a pair of spaced targets wihch have been designated red target and green target on FIG. 1 are known, and it will be apparent that, if these two targets are the only targets available for reflecting signals to the ship 20, the travel times of signals to and from the targets could be measured without extreme difficulty. However, there are invariably many unknown or undesired targets in the general locality of the desired targets (as indicated by X marks in FIG. 1), which also provide reflections of signals back to the ship 20. It may also be noted that these undesired targets are frequently either between the ship 20 and the desired targets, or substantially in line with the ship and the desired targets.

In order to minimize the possibility of obtaining erroneous time measurements which would be caused by signals reflected to the ship from these various unknown and undesired targets, we utilize only those signals reflected to the ship 20 from targets positioned in the immediate vicinity of the red and green targets. This result is obtained by, in effect, ignoring all signals reflected to the ship except those signals which are reflected from targets located between azimuths 22 and 24 and distance lines 26 and 28 associated with the red target, and azimuths 22a and 24a and distance lines 26a and 28a associated with the green target. In other words, we utilize only those signals reflected to the ship which could have been reflected by targets within the areas bounded by the lines 22, 24, 26 and 28 or 22a, 24a, 26a and 28a associated with the respective red and green targets, which involves both azimuth and range controls, such that the possibility of obtaining erroneous time or distance measurements is greatly minimized. Obviously to obtain these azimuth and range controls the approximate directions and distances of the red and green targets from the ship 20 must be known. However, since any ship is provided with some sort of navigation equipment, these approximate directions and distances may be easily determined.

As previously indicated, it is also preferred that the red and green targets be of special construction and precisely located in the desired positions before a surveying operation, although natural, existing targets may be used if they provide good reflecting surfaces and are easily and accurately located on a map of the area. When specially constructed targets are utilized for the red and green targets, the signals transmitted from the ship 20 may be polarized in a given direction, such as vertically, and the reflecting surfaces of the specially constructed targets may be easily formed to provide reflection only of signals polarized in the required direction, such that the red and green targets will provide distinct reflected signals which may be more easily distinguished from other reflected signals and from which time measurements may be accurately made.

The red and green targets shown in FIG. 1 are the only targets necessary to accurately determine the position of the ship 20 as long as the precise distance of the ship from each of these targets is known. However, since the ship is moving, it will frequently get out of range of one of the initial targets, say, the red target. Therefore, it is highly desirable to locate an additional target, such as the yellow target shown in FIG. 1, which may be used with the green target when the ship gets out of range of the red target. The yellow target may take any desired form, such as a buoy firmly anchored in position, and the precise position thereof at the beginning of a survey need not be known. As the ship is continuously positioned with respect to the red and green targets, the operator of the system starts measuring the distance between the ship and the yellow target. As will be apparent to those skilled in the art, the precise position of the yellow target may be plotted if the distance between the ship and the yellow target is known at at least two spaced positions of the ship. Thus, before the red target gets out of range, the yellow target is precisely located. When the red target is out of range, the operator may use the green and yellow targets to track the course of the ship. Other new targets are located and used in the same manner as the ship proceeds in a surveying operation.

Figure 2:
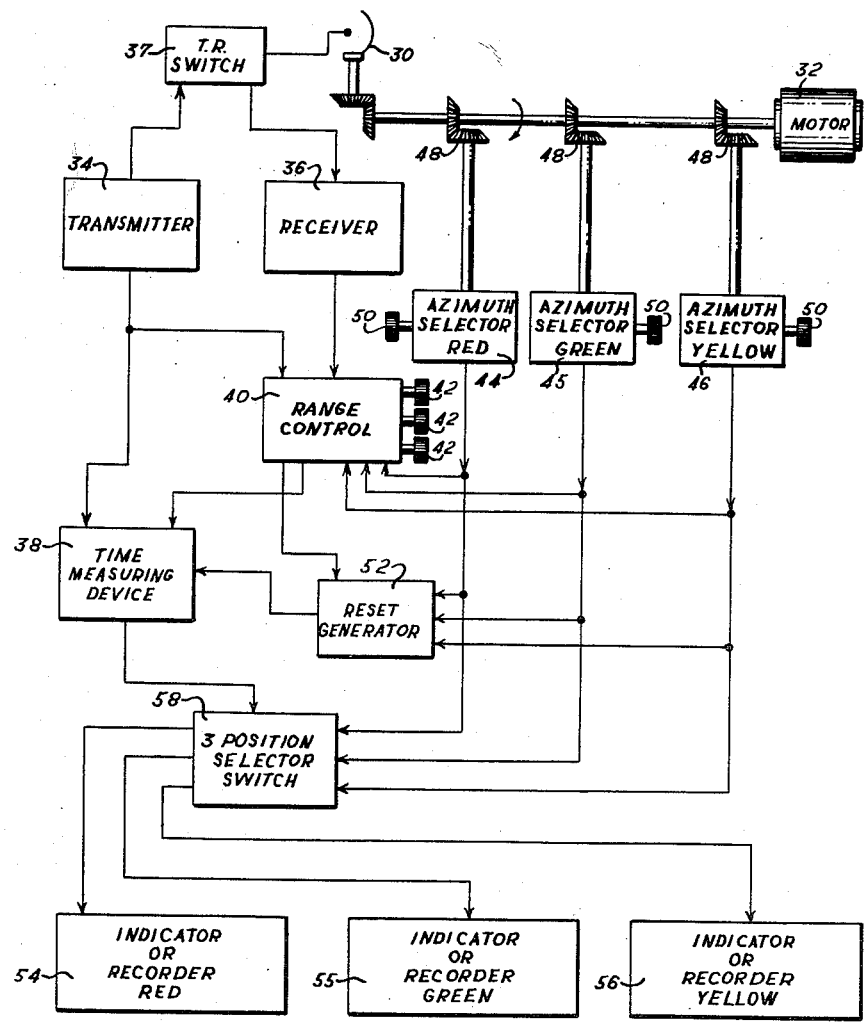
FIGURE 2 is a schematic illustration of one embodiment of this invention.

As shown in FIG. 2, the present system basically comprises a suitable transmitting and receiving directional antenna 30 mounted on the surveying ship and which is preferably constructed for rotation through a 360-degree arc, as by use of a suitable motor 32. Signals are fed to the antenna 30 from a suitable transmitter 34, and the signals received by the antenna 30 are fed to a suitable receiver 36, with the signals being transmitted by the transmitter 34 and received by the receiver 36 being controlled by a transmitter-receiver switch 37 (commonly known as a TR switch). The TR switch 37 provides a transmission of a signal by the antenna 30 and then the feeding of a reflected signal from the antenna to the receiver 36 in an alternating manner, and as is conventional in present-day radar systems. The antenna 30, transmitter 34, receiver 36 and TR switch 37 may be a portion of substantially any radar system, such as a Raytheon 1500 radar, commonly known as a Pathfinder.

In accordance with the present invention, the transmitter 34 transmits a pulse-type signal to a time-measuring device 38 each time a signal is sent from the transmitter 34 through the TR switch 37 to the antenna 30. These pulse-type signals fed by the transmitter 34 to the time-measuring device 38 will be hereafter referred to as "start" pulses and are utilized to start operation of the time-measuring device 38, as will be more fully hereinafter set forth. Also, each time a reflected signal is fed from the antenna 30 through the TR switch 37 to the receiver 36, the receiver 36 sends a signal to a range control device 40, which in turn sends a pulse to the time-measuring device 38 for stopping the time-measuring device when the reflected signal has been reflected from the immediate vicinity of one of the desired targets, as will also be more fully hereinafter set forth. The pulses fed from the range control device 40 to the time-measuring device 38 will be hereafter called "stop" pulses, since they are utilized to stop the time-measuring operation of the device 38.

The time-measuring device 38 may be any suitable mechanism which will measure the time between the reception of a start pulse from the transmitter 34 and a stop pulse from the range control device 40, and which may be reset. We prefer to use a time interval meter for the device 38 which will hold a total count after receiving a stop pulse and which is not affected by subsequent start or stop pulses until it is reset. After the time interval meter is reset, it starts counting upon receipt of the next subsequent start pulse. For example, we may use a No. 524B electronic counter with a model 526B time interval unit manufactured by the Hewlett-Packard Company of Palo Alto, California. The resetting of the device 38 will be described below.

The range control device 40 may be any suitable time set gating circuit which will feed a stop pulse to the device 38 in response to signals received from the receiver 36 only when the time of receipt of a reflected signal corresponds to approximately twice the expected travel time of the respective signal from the antenna 30 to one of the desired targets, and only when the respective reflected signal is received from the approximate direction of one of the desired targets. The travel time controls are adjusted by suitable knobs 42, and the direction controls of the device 40 are set by signals received from azimuth selectors 44, 45 and 46.

The selectors 44, 45 and 46 are driven by the motor 32 through suitable gears 48 and each selector has a control knob 50 to control the times when signals are fed from the respective selector to the range control device 40. Each of the selectors 44, 45 and 46 are provided for one of the desired targets. For example, the selector 44 may be provided for the red target, the selector 45 may be provided for the green target, and the selector 46 may be provided for the yellow target. Each selector 44, 45 and 46 operates to energize the range control device 40 when the antenna 30 is directed toward the respective target, such that the range control device 40 will feed stop pulses to the time-measuring device 38 only when the antenna 30 is directed toward one or the other of the desired targets. Thus, the time-measuring device 38 will be operative only with respect to signals reflected to the antenna from targets within the areas bounded by the azimuth lines 22 and 24, 22a and 24a and 22b and 24b as illustrated in FIG. 1 and as previously described.

The selectors 44, 45 and 46 and range control device 40 are also utilized to energize a reset generator 52 which feeds reset signals to the time-measuring device 38. The reset generator 52 operate to feed a reset signal to the time-measuring device 38 each time the antenna 30 is directed toward one of the desired targets and the range control device 40 is energized, such that the device 38 will start measuring time as soon as there is assurance that the reflected signals are from the correct range and the antenna 30 is directed toward one of the targets. As previously indicated, the time-measuring device 38 operates only until a stop pulse is fed thereto and will hold a total count until it is reset. Thus, the time-measuring device 38 will measure the travel time of signals transmitted from the antenna 30 and reflected back to the antenna only when the signals are reflected at a range approximately equal to the estimated range of the desired target (as set by the control knobs 42 on the range control device 40) and only during the time the antenna 30 is directed toward one of the targets (as controlled by the selectors 44, 45 and 46 through the range control device 40 and reset generator 52). As a result, the time-measuring device 38 measures the travel time of signals which are reflected from targets bounded by the lines 22, 24, 26 and 28 associated with the red target, the lines 22a, 24a, 26a and 28a associated with the green target and the lines 22b, 24b, 26b and 28b associated with the yellow target as indicated in FIG. 1 and as previously described.

The time measurements provided by the device 38 are fed to one of three registering devices 54, 55 or 56. The devices 54, 55 and 56 may be either in the form of indicators or recorders for the respective time measurements received thereby, and each of these devices is associated with one of the desired red, green or yellow targets. For example, the device 54 may be provided for the red target, the device 55 provided for the green target and the device 56 provided for the yellow target. In one embodiment of this invention, the time measurements may be fed from the device 38 through a three-position selector switch 58 controlled by the selectors 44, 45 and 46, such that each time measurement will be fed to the respective device 54, 55 or 56, depending upon whether the respective time measurement is taken with respect to the red, green or yellow target.

In summarizing the present system as illustrated in FIG. 2, it will be observed that the antenna 30 is continuously rotated through an arc of 360 degrees by the motor 32. The antenna 30 functions to alternately transmit pulse-type signals by operation of the transmitter 34 and TR switch 37, and receive reflected signals, with the reflected signals being fed through the TR switch 37 to the receiver 36. In other words, the antenna 30, transmitter 34, receiver 36 and TR switch 37 operate in the same manner as a present-day radar system to alternately transmit pulse-type signals and receive signals which may be reflected from any target back to the antenna, with no discrimination being made between the targets which reflect the signals back to the antenna. Each time a signal is transmitted from the transmitter 34 and the antenna 30, a start pulse is fed to the time-measuring device 38. However, these start pulses are effective in starting the operation of the time-measuring device 38 only when the time-measuring device is reset.

Each time a reflected signal is received by the receiver 36, a signal is fed to the range control device 40 to provide a stop pulse for the time-measuring device 38, providing certain conditions are met. One condition is that before the range control device 40 will feed a stop pulse to the time-measuring device 38, the reflected signal received by the receiver 36 must have a travel time approximately equal to the expected travel time of a reflected signal from one of the desired targets, as controlled by the setting of the knobs 42. In this connection it will be noted that the control knobs 42 may be set in any desired manner, such as manually, for each of the red, green and yellow targets, since the ranges of these targets from the antenna 30 may be different. The other condition for feeding a stop pulse from the range control device 40 to the time-measuring device 38 is that the reflected signal may be received from the direction of one of the desired targets, as controlled by the selectors 44, 45 and 46. That is, when the antenna 30 is directed toward the red target, the selector 44 energizes the range control device 40; when the antenna 30 is directed toward the green target, the selector 45 energizes the range control device 40, and when the antenna 30 is directed toward the yellow target, the selector 46 energizes the range control device 40. Thus, the reflected signals will give rise to stop pulses only when the reflected signals are received from targets in the immediate vicinity of the red, green or yellow targets. It will also be observed that the time-measuring device 38 is reset when the antenna is directed toward either the red, green or yellow target and stop pulses are generated in the range control device 40, such that the device 38 will measure the time between the transmission of a predetermined transmitted signal from the antenna 30 toward the respective target and the reception of the respective reflected signal from the target, and this time measurement or count will be held by the device 38 until the device is again reset.

The time measurements provided by the device 38 are fed to the respective indicators or recorders 54, 55 or 56 through the three-position selector switch 58, such that the precise distance from the antenna 30 to each of the red, green and yellow targets may be precisely determined. Hence, the precise position of the ship 20 with respect to the red and green targets may be determined. Also, the yellow target may be precisely located for subsequent use as the ship travels along its course, as previously indicated.

A preferred embodiment of the present invention is illustrated in detail in FIGS. 3 through 13. Referring to FIG. 3, it will be observed that we utilize the antenna 30, motor 32 for driving the antenna, the transmitter 34, receiver 36 and TR switch 37 as previously described in connection with FIG. 2 and which may be a part of an existing radar system. In the preferred embodiment we also utilize the cathode ray tube 60 of the PPI indicator of the existing radar system connected to the receiver 36 for monitoring operation of the present system. It may also be noted that the display on the cathode ray tube 60 of the existing radar system may be utilized to obtain the approximate distances and directions of the red, green and yellow targets from the ship for setting the controls of the present system as previously indicated.

In this preferred embodiment, the motor 32 drives a synchro-transmitter 62 of any suitable type (such as a Navy Ordnance, size 3, 60-cycle transmitter) which provides an output signal representative of the movement of its input shaft, and hence representative of the movement of the antenna 30. The output signal from the synchro-transmitter 62 is fed to a synchro-differential 64 which is controlled by a gyro repeater 66 through a mechanical coupling 68. The synchro-differential generator 64 may be of any suitable type (such as a Naval Ordnance, size 3, differential synchro-generator) wherein the output signal thereof is representative of rotation of the antenna 30 related to true north as provided by the gyro repeater 66. The output signal from the synchro-differential generator 64 is fed to a pair of synchro-receivers 70 and 72, such that rotation of the output shafts of the receivers 70 and 72 are representative of rotation of the antenna 30. The synchro-receivers 70 and 72 may also be of any suitable type (such as Navy Ordnance, size 1, 60-cycle synchro-receivers) to mate with the synchro-differential generator 64 and the synchro-transmitter 62.

The receiver 70 drives the sweep beam of the cathode ray tube 60, such that the position of the sweep beam of the tube is related to the position of the antenna 30 at all times. In this connection it may be noted that when the gyro repeater 66 is used, the display on the cathode ray tube 60 is always maintained oriented in the same direction, as indicated by the N on the face of the tube in FIG. 3. The receiver 72 is utilized to drive the selectors 44, 45 and 46 (see also FIG. 4) through suitable gearing 74, such that the selectors 44, 45 and 46 are driven in response to the motor 32 and in accordance with the rotation of the antenna 30, as previously described in connection with FIG. 2. In the preferred embodiment, however, the gearing 74 is sized to provide rotation of its output shaft 74a at half the speed of rotation of the antenna 30, for purposes to be described.

The output shaft 74a drives another synchro-transmitter 76 which in turn feeds signals to a control transformer 78 (FIG. 4) of each of the azimuth selectors 44, 45 and 46. The control knobs 50 of the selectors shown in FIG. 2 and previously described are connected to the respective control transformers 78 to vary the null provided by each control transformer, which in turn controls the feeding of stop pulses to the range control 40 and reset generator 52 as will be more fully hereinafter set forth. Each control transformer 78 provides nulls 180 degrees apart, hence the synchro-transmitter 76 is driven only one half as fast as the antenna 30 to provide a null in the output of each control transformer 78 each time the antenna is directed toward the respective target.

Each of the azimuth selectors 44, 45 and 46 is constructed in the same way, hence the construction and operation of only the selector 44 will be described. The output of the control transformer 78 is stepped up by a suitable center-tapped transformer 79 and then rectified by diodes 80. Any A.C. components in the rectified signal are drained to ground through a capacitor 81 and the rectified signal is then applied to one grid of a multivibrator 82 through a variable resistor 83. The multivibrator 82 in turn operates a biased binary relay 84 having a two-position switch arm 85 biased magnetically by a pair of spaced permanent magnets 84a. Each magnet 84a retains the switch arm 85 engaged with its associated contact 85A or 85B until the output of the multivibrator 82 reaches a predetermined amplitude in the opposite coil of the relay 84. Thus, as the signal fed to the multivibrator 82 approaches a null, the output of the respective tube of the multivibrator decreases, but the switch arm 85 does not move until a predetermined amplitude is reached in the opposing coil, since the respective magnet 84a will retain the switch arm engaged with the respective contact, say contact 85A. When the predetermined amplitude has been reached in the opposing coil, the switch arm 85 is snapped into engagement with the opposite contact 85B. As the signal fed through the variable resistor 83 leaves the null point, the state of the multivibrator is reversed and the switch arm 85 snaps in the opposite direction back to the contact 85A when the amplitude of the multivibrator reaches a predetermined value. Thus, the permanent magnets control what may be considered the threshold values of the relay 84. And, since the amplitude of the current in the relay coils is directly related to the amplitude of the signal fed through the variable resistor 83, the setting of the resistor 83 controls the length of time during which the contact 85B is engaged by the switch arm 85. The contact 85B is connected to energize the range control 40, reset generator 52 and selector switch 58, as will be more fully described below.

To review the operation of the azimuth selector 44, it will be observed that the closure of contact 85B energizes the range control 40, among other things, and the time and length of closure may be adjusted. The time of closure of contact 85B is controlled by the nulls in the output of the control transformer 78 which are in turn controlled by the setting of the knob 50. Thus, the nulls in the output of the control transformer are adjusted to occur when the antenna 30 is directed at the red target. The length of closure of the contact 85B is controlled by the variable resistor 83 to maintain the range control 40 energized through the desired degrees of sweep of the antenna 30. As a result, any desired width of area may be investigated for signals reflected from the red target. If there are interfering targets close to the red target, the width of the area from which signals are received may be reduced to, say, the width of the radar beam, and the time of closure of contact 85B adjusted frequently by the knob 50 as the ship moves relative to the red target. If, on the other hand, there are no interfering targets close to the red target, the width of the search area may be increased to minimize adjustments of the knob 50 and hence the attention of the operator of the system.

As previously indicated, the azimuth selectors 45 and 46 are constructed in the same way as the selector 44, and the various parts have been given the same reference numbers, except for the switches. We have used reference character 86 for the switch arm of selector 45 and reference character 87 for the switch arm of selector 46. In each instance the B contact is connected to the range control 40, reset generator 52 and selector switch 58 in the same manner as contact 85B.

As also shown in FIG. 3, start pulses are fed from the transmitter 34 through a conductor designated by reference character 88, and reflected signals are transmitted from the receiver 36 through a conductor 89 in the same manner as previously described in connection with FIG. 2.

The connections of the azimuth selectors 44, 45 and 46 to the range control device 40 are shown in FIG. 5. The B contact of each of the switches 85, 86 and 87 is connected to the coil of a relay RY1, RY2 or RY3. The opposite end of each relay coil is grounded, and the switch arm of each of the switches is connected to a suitable source of D.C. energy, such as a battery 90. Thus, each of the relays RY1, RY2 and RY3 will be energized upon closure of the B contact of the respective switches 85, 86 and 87.

As previously described in connection with FIG. 2, the range control device is provided with an adjustment to feed stop pulses to the time-measuring device 38 only when the reflected signals are received from targets having substantially the same ranges as the desired targets. In the embodiment shown in FIG. 5, this adjusting means takes the form of three manually adjustable potentiometers P1, P2 and P3. The potentiometer P1 is associated with relay RY1 and the selector 44 and is adjusted to a predetermined setting depending upon the estimated range of the red target from the ship. The potentiometer P2 is associated with the relay RY2 and the selector 45 and is adjusted in accordance with the estimated range of the green target. The potentiometer P3 is associated with relay RY3 and the selector 46 and is adjusted to a predetermined setting depending upon the estimated range of the yellow target from the ship. It will also be noted that the potentiometers P1, P2 and P3 are connected to a common ground through a resistor R111, as well as a source of negative D.C. energy 92 having a voltage of, for example, −105 volts. The negative D.C. source 92 is also connected to one of the contacts of each of the relays RY1, RY2 and RY3 and is utilized to control the D.C. bias on the control grid of a tube V16 which energizes gate control circuits in the range control device 40, as will be described, to control the range from which the reflected signals must come in order to send stop pulses to the time-measuring device. Since the relays RY1, RY2 and RY3 operate in the same manner, a description of only one of the relays will be necessary.

When the switch arm 85 engages the contact 85B, current from the source 90 is passed through the coil of relay RY1 to shift the switch arm of the relay and connect the D.C. bias 92 to the tube V16 through the potentiometer P1. It will then be apparent that the bias on the control grid of the tube V16 is increased toward zero, depending upon the setting of P1, which in turn controls the minimum range from which reflected signals will produce stop pulses in the range control device 40. This condition remains as long as the arm of the switch 85 remains in engagement with contact 85B. As soon as the switch 85 is moved to open the contact 85B, the energy supplied to the coil of the relay RY1 is discontinued and the relay shifts positions. The negative bias from the source 92 is then impressed directly on the control grid of the tube V16 to close the gate circuits, as will be described. It will thus be noted that the potentiometers P1, P2 and P3 function in the same manner as the control knobs 42 previously described in connection with FIG. 2 to control the ranges from which the reflected signals will be utilized to send stop pulses to the time-measuring device 38.

As will be described in detail hereinafter, the range control device 40 is connected back to the cathode ray tube 60 (FIG. 6A) and a bright arc 96 is provided on the face of the tube corresponding to each of the range settings provided by the potentiometers P1, P2 and P3 between the indications on the tube of the respective targets and the ship for monitoring the operation of the system. When adjusting the ranges provided by the potentiometers P1, P2 and P3, the respective relay RY1, RY2 or RY3 may be manually energized by the operator closing an auxiliary switch SW1, SW2 or SW3. For example, assuming that the range adjustment associated with the red target needs adjusting, the operator closes the switch SW1 to energize the coil of the relay RY1 to continuously hold in the potentiometer P1 and provide a continuous bright circle on the face of the cathode ray tube 60. While adjusting the potentiometer P1, this bright circle moves in or out, depending upon the adjustments, and the potentiometer is adjusted until the circle shown on the cathode ray tube is immediately inward of the point on the tube indicating the red target. When the switch SW1 is released and opened, the range control device 40 will function in a normal manner.

Figure 6A:
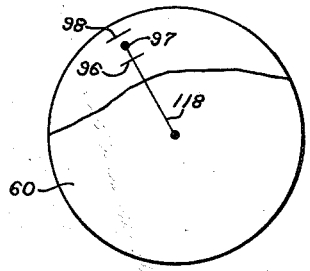
FIGURE 6A is a schematic illustration of the face of a cathode ray tube showing how the operation of the preferred system may be monitored.
Figures 7, 10:
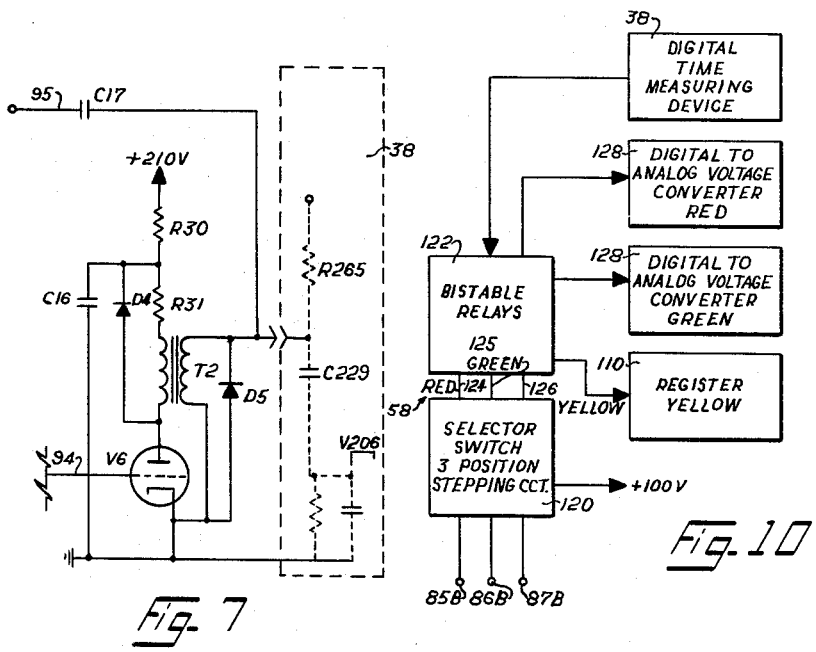
FIGURE 7 is a continuation from the right-hand end of FIG. 6.
FIGURE 10 is a schematic illustration of the preferred selector switch.

A wiring diagram for the range control device is illustrated in FIGS. 6 and 7, it being observed that FIG. 7 is a continuation from the right-hand end of FIG. 6, and these two figures should be utilized together in this disclosure. It may also be noted in FIG. 6 that the relays RY1, RY2 and RY3, and the potentiometers P1, P2 and P3, are again illustrated to complete the wiring diagram. As previously indicated, this device functions to scan the reflection information which is continually received by the receiver 36 to eliminate targets which give erroneous distance readings. The device 40 includes a monostable multivibrator 93 which is energized by start pulses through the conductor 88 from the transmitter 34 to provide a square-wave output each time a start pulse is fed to the multivibrator. The square-wave output of the multivibrator 93 is fed through capacitor C1 and resistor R1 to the control grid of a tube V1 against resistor R2 and condenser C2 which provides a negative going triangular wave form at the plate of tube V1. Tube V1 may be of any suitable type which will provide the desired wave form on the plate thereof and may be, for example, one half of a type 5963 tube. Resistor R4 is preferably about one half the value of R3 and is connected to the cathode of tube V1 to allow large voltage excursions on the grid and plate of tube V1.

The negative going triangular wave form is fed through a capacitor C3 and resistor R5 to the first stage V2a of another tube V2. V2 is a Schmitt trigger with a narrow hysteresis range where switching occurs when the left-hand grid dips below 10 volts. Resistors R5 and R6 comprise a voltage divider between a positive quiescent voltage at the junction of R3 and R5 and a negative, manually imposed bias from tube V16. As previously noted in connection with FIG. 5, the biasing through the tube V16 is controlled by the adjustable potentiometers P1, P2 and P3 to control the range of the desired reflected signals. At some repeatable time on the triangular wave, the Schmitt trigger will switch the second stage V2b of tube V2 into saturated conduction.

The plate load of V2b is a transformer T1 which will "ring" when high currents flow in the primary winding. Overshoot is suppressed by diode D1 so that only the first half-cycle will appear at the output terminal (pin No. 4) of the transformer. We have used a transformer manufactured by the Hermatic Seal Transformer Co., Garland, Texas, part #955–0002–000. This transformer, in one embodiment of this invention, is specially chosen for its resonance frequency and produces a 50-volt pulse when a high current flows in the primary winding.

The pulse produced by the transformer T1 is fed to the suppressor or gating grid of a tube V5 (such as a type 6AS6 tube) through resistor R19 and is clamped to a negative power source, such as a —105-volt bus, by diode D3. Since the cathode of tube V5 (along with the other grids) is biased highly negative, the plate is grounded through resistor R20 and inductance L2, the plate load for tube V5. The resistors R21, R22, R23 and R24 and potentiometer P4 comprise the bias adjusting network, while condensers C12–C15 are stabilizing condensers for this network.

The reflected signals received by the receiver 36 are fed through the conductor 89 (which is in the form of a coaxial cable) to resistor R17, the termination resistor and cathode resistor of a grounded grid amplifier tube V4. Resistors R13 and R18 give negative bias to this stage. Capacitor C7 grounds the grid to signals. The reflected signals appear at the plate of tube V4 and are fed to the control grid of the gating tube V5 through a blocking capacitor C8. Resistors R15 and R16 and inductance L1 comprise the plate load for tube V4.

The tube V5 forms a gate for the reflected signals, and the gate is "on" when the suppressor grid is clamped to the —105-volt bus, such that signals can go through the gate stage and through the conductor 94 to the time-measuring device. The wave form at the plate of tube V5 is a result of the gating signal from transformer T1 and the reflected signals from amplifier V4. The time-measuring device 38 connected to the conductor 94 can be adjusted to be sensitive only to the reflected signals passing through gate V5. The reflected signals passing through the gate V5 function as stop pulses to stop the counting operation of the time-measuring device.

In order to monitor the operation of the gating control, and monitor the range from which reflected signals are utilized in the range control device 40, the cathode resistor R10 in the V2b Schmitt trigger is coupled to the cathode of the first stage V3a of tube V3 (such as a type 5965 tube) through a diode D2. Tube stage V3a is a biased detector which amplifies the peak of the switching transient from the cathode of the Schmitt trigger. Resistor R27, potentiometer P5 and capacitor C9 comprise the biasing arrangement. Tube stage V3b is a cathode follower for power amplification of this transient and drives the intensity grid of the cathode ray tube 60 positive each time the signal gate comes on. This connection of the cathode follower V3b to the intensity grid of the cathode ray tube is indicated by the conductor 95 in both FIG. 6 and FIG. 3. The resulting intensity modulation on the cathode ray tube provides a bright line or arc 96 on the face of the cathode ray tube as illustrated in FIG. 6A immediately inward of the spot 97 which indicates the position of the respective target. This bright line appearing on the face of the cathode ray tube informs the operator of the system that the gate is on at a certain range and will be on for a certain distance, such as 4000 feet. Also (see FIG. 7) a tube V6 and transformer T2 are provided to send a similar signal through the conductor 95 when the gate is closed to provide another bright line or arc 98 on the face of the cathode ray tube immediately beyond the bright spot 97 indicating the respective target. The grid of tube V6 is connected to the plate of the gating tube V5 through conductor 94a and quickly goes into conduction when the plate of tube V5 goes to zero volts, giving a transient in transformer T2 which, when shaped by diodes D4 and D5, leaves a small positive going spike for the intensity modulation. Resistor R31 is a plate load for tube V6 and capacitor C17 is a coupling capacitor to the cathode ray tube.

When the time-measuring device 38 is in the form of a No. 526B time interval meter manufactured by Hewlett-Packard Company, the wave form at transformer T2 may also be used to stop the count of the meter if the expected target is not in existence. This connection of the transformer T2 to the meter is illustrated in FIG. 7 wherein the dashed lines indicate elements already existing in the meter and illustrated in Hewlett-Packard drawings of the meter. The object of this connection is to prevent the meter from making an erroneous count and fouling the operation of the system in the event no reflected signals are received from the expected target. It will be understood that this signal from the transformer T2 is fed to the time interval meter after the stop pulse should have been fed to the meter from the plate of the tube V5 through conductor 94, such that the transformer T2 cannot prevent the proper receipt of a stop pulse from the range control device 40 when the gate is on.

The connections of the azimuth selectors 44, 45 and 46 to the reset generator 52, as well as the connnection of the reset generator 52 to the time-measuring device 38, are illustrated in FIG. 8. The reset generator 52 includes a three-channel network of diodes 100 connected to the B contacts of the selector switches 85, 86 and 87 to produce a square-wave output signal at a common terminal 101 when any one of the selector switches engages its B contact. The terminal 101 is in turn connected to a terminal 102 of the reset circuit 103 of the time-measuring device 38. The reset circuit 103 of a typical time interval meter has two terminals 102 and 104 which must be consecutively energized in order to reset the time-measuring device 38. In other words, what may be called a "get ready" signal must first be applied to the terminal 102 and then what may be called a "do it" signal must be applied to the terminal 104 before the time-measuring device is reset and is ready to start a new count. Thus, when any one of the selector switches 85, 86 or 87 is moved into engagement with its B contact, a "get ready" signal is immediately applied to the reset circuit 103, but the reset circuit still needs a "do it" signal in order to reset the time-measuring device. It will be recalled that the selector switches are individually moved into engagement with their respective B contacts when the antenna 30 is approaching or is directed at the respective target, depending upon the desired width of the search area associated with the respective target.

It will be apparent that the "do it" signal could also be applied by the diode network to the terminal 104 and reset the time-measuring device 38 immediately upon closure of one of the selector switch B contacts. We have found, however, that what may be considered temporary targets (such as birds) are sometime in the immediate vicinity of a desired red, green or yellow target and will momentarily produce erroneous reflections which produce false stop pulses in the range control device 40 and result in erroneous time measurements. As a result, we have found it highly desirable to delay resetting the time-measuring device 38 until it is virtually certain that the reflected signals are being produced by the desired red, green or yellow target. This is accomplished by resetting the time-measuring device 38 with the second, third or later stop pulse derived from signals reflected from the desired target, as explained below.

Stop pulses are taken out of the time-measuring device 38 and fed through and AND gate 105 to a preset counter 106 which will provide a pulse output after a predetermined number of pulses (such as 2, 4, 6, 8, 10, etc.) have been fed thereto. However, the AND gate 105 is controlled by the "get ready" signal from terminal 101 (after passage through a suitable delay device 105a to eliminate spurious signals arising from relay switching), such that stop pulses will not be fed to the preset counter 106 unless one of the selector switches 85, 86 or 87 is engaged with its B contact, to assure that the preset counter 106 will not be in condition to produce a "do it" pulse unless a series of stop pulses derived from a desired search area are fed thereto. It will also be noted that the "get ready" signal resets the preset counter to zero immediately prior to opening of the AND gate 105. Each pulse produced by the preset counter 106 is amplified by a suitable pulse amplifier 107 and then applied to the reset circuit terminal 104 as a "do it" signal. Upon resetting of the time-measuring device 38, the device measures the time interval between receipt of the next start pulse and the next stop pulse.

In one form of the invention, as illustrated in FIG. 8, the count provided by the time-measuring device 38 is fed in the form of a signal having an amplitude representative of a digital value to one of three digital registers 108, 109 or 110 (for the red, green and yellow targets, respectively) from which the separate counts may be visually observed. Each of the registers 108, 109 and 110 is constructed to take only one count at a time and is reset as soon as the respective target search area is reached by a signal from the respective selector switch B contact fed through a diode 112 and AND gate 113 in order to register the next count. However, the respective AND gate 113 is not opened until the time-measuring device is counting to produce a signal through the conductor 95 previously described. Thus, the conductor 95 may be connected to the AND gate 113 is parallel, and each count produced by the device 38 may be fed to all of the registers 108, 109 and 110 and yet the registers will only indicate the counts provided by their respective targets.

In reviewing the operation of the system to this point, it will be observed that when the beam of the antenna 30 reaches the desired search area of one of the desired targets, the respective selector 44, 45 or 46 energizes the reset generator 52 and notifies the reset circuit 103 of the time measuring device 38 to get ready to reset. As soon as a predetermined number of stop pulses have been received, the reset circuit 103 is energized to reset the time-measuring device 38—thus assuring that the antenna beam is on the desired target. After each reset, the first start pulse received by the time-measuring device 38 from the transmitter 34 starts the time-measuring operation of the device 38. The device 38 measures time between the receipt of such a start pulse and the receipt of the first stop pulse from the range control device 40 to indicate the travel time of a signal from the antenna 30 to the desired target and back to the antenna 30. It will be recalled that the range control device 40 does not send a stop pulse to the time-measuring device 38 until a reflected signal is received by the antenna 30 which has a travel time approximately equal to the expected travel time of a signal from the desired target, such that the time-measuring device 38 will not be stopped by reason of any undesired target which may be reflecting signals back to the antenna 30 from a point between the antenna 30 and the desired target. When the time-measuring device is in the form of a time interval meter of the preferred form, the time measurement provided by the device 38 is digital and is supplied in the form of a D.C. voltage for each digit which, as a group, are indicative of the particular time measurement. Also, in the form of the invention shown in FIG. 8, the time measurements are fed to the digital registers 108, 109 and 110 for visual take-off. It will also be apparent that these measurements may be converted in the registers to display the measurements in distance units rather than in time units.

Figure 9:
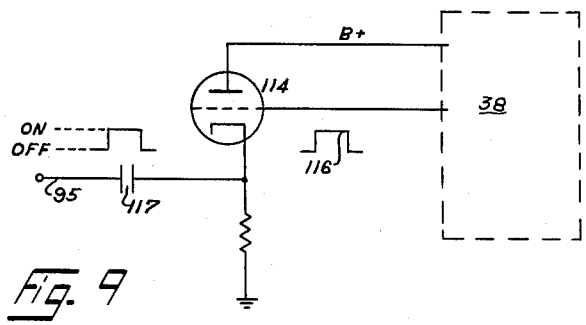
FIGURE 9 is a wiring diagram of a portion of the monitoring system.

To further assist in the manual control of the present system, and in monitoring the operation of the system, we provide (see FIG. 9) an amplifier 114 having its control grid connected to the time interval meter 38 in any suitable manner, such that the grid is supplied with a positive D.C. signal when the meter 38 is measuring time, as indicated by the wave form 116 in FIG. 9. The plate of the amplifier 114 is connected to a source of positive D.C. in the meter 38, such that the cathode of the amplifier will provide a power amplification of the signal 116. The cathode of the amplifier 114 is connected by the conductor 95 to the intensity control grid of the cathode ray tube 60 through a capacitor 117. As a result, a bright line 118 appears on the face of the cathode ray tube 60 extending from the center of the tube (which indicates the position of the ship) to the target toward which the antenna 30 is being directed while the meter 38 is counting. The length of this bright line 118 informs the operator whether or not the system is operating properly, since this bright line is indicative of the travel time of the reflected signal used to initiate a stop pulse to the meter 38; and if such reflected signal is reflected from the desired target, the bright line 118 will extend to this target. However, if the reflected signal is reflected from any other target, the bright line will extend to the target actually producing the bright line and the operator will then be advised that the system is not operating properly.

Figure 11:
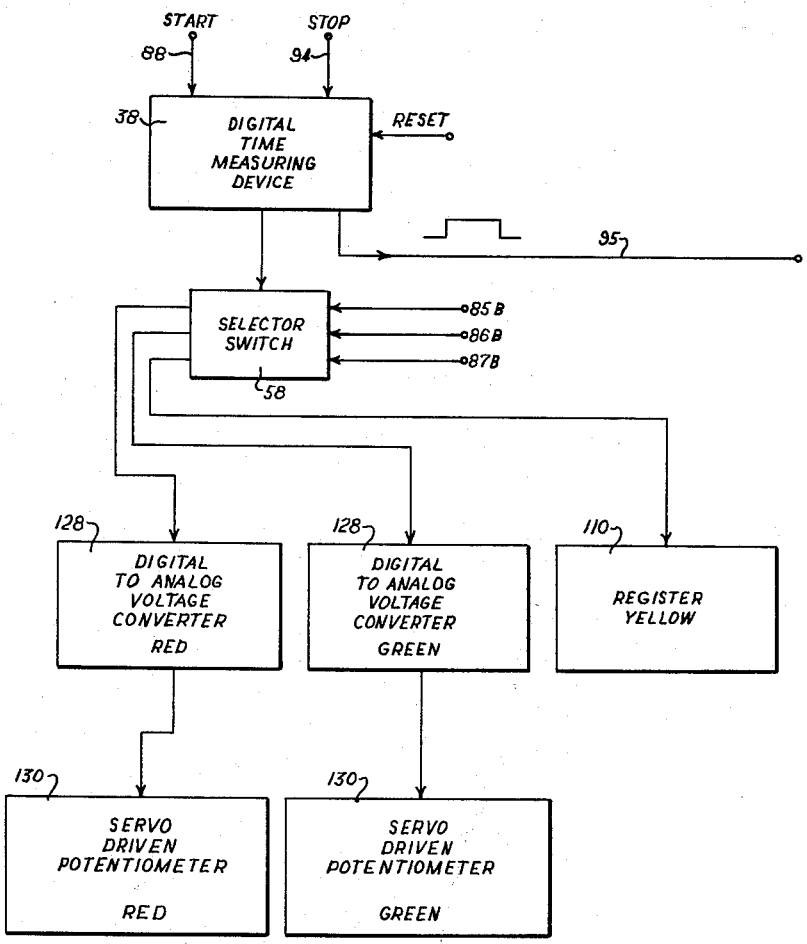

In an embodiment of this invention particularly adapted for using an automatic plotter, we prefer to use a three-position selector switch 58 as shown in FIGS. 2 and 10. The three-position selector switch 58 (see FIG. 10) preferably comprises a three-position selector switch stepping circuit 120 of the holding or integrating type which is actuated by either pulses or steady state D.C. (such as the type manufactured by G. H. Leland, Inc. of Dayton, Ohio) connected to three suitable bistable relays 122 by conductors 124, 125 and 126. The input to the stepping circuit 120 is from the contact 85B of the selector 44, contact 86B of the selector 45 and from the contact 87B of the selector 46. The stepping circuit 120 sends signals through the conductor 124 to the relays 122 when the antenna 30 is pointed at the search area of the red target; the stepping circuit sends signals through the conductor 125 to the relays 122 when the antenna 30 is pointed at the search area of the green target, and the stepping circuit sends signals through the conductor 126 to the relays 122 when the antenna 30 is pointed at the search area of the yellow target. In one embodiment, the D.C. voltages produced by the time interval meter 38 (which is a digital representation of the time measurement) are also fed to the bistable relays 122, and the relays 122 operate to feed this signal to either one or the other of two digital-to-analog voltage converters 128, or to the register 110, depending upon whether the time measurement is being taken with respect to the red, green or the yellow target. Since the yellow target is not necessarily used in positioning the ship, it is not necessary to convert signals relating to this target to analog voltages. This embodiment is also illustrated in FIG. 11 where it will be observed that the output of each of the converters 128 is fed to its respective servo-driven potentiometer 130 associated with a suitable registering device, as will be hereinafter described. Each of the converters 128 functions to convert the digital output of the time-measuring device 38 to an analog voltage proportional to the respective time measurement and which may be used to drive a servo-driven potentiometer.

As an alternate embodiment (FIG. 12), the signal representing a digital time measurement being supplied by the time interval meter 38 for each of the red and green targets may be fed first to a digital storage device 129 and through a coincidence gate 129a before being fed to the voltage converter 128. In this embodiment, each coincidence gate 129a is controlled by both the storage device 129 and the respective converter 128, such that spurious measurements will not be fed to the potentiometers 130 and foul the plotter operated by the potentiometers. As will be apparent upon analysis of the present system, the distance between the ship and each of the targets will change rather gradually as the ship proceeds along its course. The degree of change in distance will vary with the course and speed of the ship, but will normally change the digital readings of the storage devices 129 a limited amount, say one or two digits. Each gate 129a is connected to prevent transfer of the digital value from the storage device 129 to the converter 130 when the change between successive values is greater than a predetermined amount. Thus, if a spurious value is obtained, as from a temporary target within the respective search area, the spurious measurement is ignored to prevent fouling of the plotting device.

Each servo-driven potentiometer 130 is preferably constructed as illustrated schematically in FIG. 13, and comprises a suitable helical slide wire type potentiometer 132 having a reference voltage supplied by any suitable means 134, and having a calibrating resistor 136. The sliding contact 138 of the potentiometer 132 is connected either to a digital-to-analog voltage converter 128 (as illustrated in the embodiment of FIG. 11) or to the selector switch 58 (as illustrated in the embodiment of FIG. 12) to receive an analog voltage proportional to the distance of the antenna 30 from the desired target giving rise to the analog voltage. One end of the potentiometer 132 is connected to a suitable servo-amplifier 140 which in turn feeds amplified signals to a servo-motor 142. The output shaft 144 of the motor 142 is mechanically connected to the sliding contact 138 of the potentiometer 132, as indicated by the dashed line 146, to move the contact 138 when the shaft 144 is turned, which provides a feedback through the potentiometer 132 and tends to provide a zero voltage to the servo-amplifier 140. As a result, the motor shaft 144 is retained in a position provided by a particular analog voltage supplied to the sliding contact 138 until a subsequent and different signal is supplied to the sliding contact 138 from one of the converters 128 or the selector switch 58; whereupon, the output shaft 144 will be turned to a degree depending upon the difference between the successive voltages applied to the sliding contact 138. In other words, if subsequent voltages supplied to the sliding contact 138 vary, the shaft 144 will be turned in accordance with the difference between these two voltages. However, if subsequent voltages supplied to the contact 138 are equal, the motor shaft 144 remains in its previous position by action of the potentiometer 132 and the mechanical linkage 146. The motor shafts 144 associated with the red and green targets are preferably connected to a suitable plotting device (not shown) for automatically plotting the position of the ship on a map of the area being surveyed. However, it is not necessary that the motor shaft 144 associated with the yellow target be connected to a plotter. The output of the yellow target motor shaft 144 is preferably connected to a simple visual register (not shown), whereby the operator can manually plot in the position of the yellow target on the plotting map for subsequent use as a red or green target as previously indicated.

In the embodiment previously described, the time-measuring device 38 provides a digital measurement of the travel time of a single signal from the antenna 30 to the desired target and back to the antenna 30, which will in turn indicate the distance of the antenna 30 from the respective target. Such a system provides substantially more precise distance measurements than existing position determining systems and will have great utility in many operations. However, we also contemplate the averaging of a plurality of travel times each time the antenna is directed at one of the desired targets to provide substantially increased precision in the time measurement. As is well-known, an averaging operation involves both a summing operation and a dividing operation. In the present system the summing operation is performed in the time-measuring device 38 and the dividing operation is performed in the converter or converters 128. In order to provide the average of a plurality of travel times, we add voltage-dividing networks to the converter 128 and modify a time interval meter of the type 524B produced by the Hewlett-Packard Company in the manner illustrated in FIG. 14. In FIG. 14 the dashed lines are taken from drawings of a Hewlett-Packard 524B counter and it is not believed necessary to describe these portions of the counter in detail. The solid lines shown in FIG. 14 illustrate elements added to an existing 524B counter to provide the summing operation.

Basically, the modification shown in FIG. 14 involves the addition of a Hewlett-Packard type XZ209 decade-counting unit 202, and a combination tube comprising a cathode follower V100 and an amplifier V200, such as a type 5965 tube, to an existing 524B counter. The addition of the decade-counting unit 202 and other circuitry changes the characteristics of the meter such that it is then responsive to ten sequential start and stop pulses before holding a total count, rather than being responsive to a single start pulse and a single stop pulse as previously described.

The blocking oscillator transformer T201 in the existing time interval meter produces a pulse each time the meter is energized for a counting operation. This signal is inverted and fed to pin No. 5 of the decade-counting unit 202 which operates the display time thyratron V205 of the existing meter through the cathode follower V100 on the tenth start pulse received by the meter. Condenser V203 is the coupling capacitor and diode D206 is an overshoot limiter at the input of the decade-counting unit 202.

Tube V200 receives the gate condition information and drives the intensity control element in the cathode ray tube 60 through conductor 95 in the manner previously described to indicate to the operator of a system that the meter is counting. The output of the meter 38 may be fed to a printing command network 210 which is normally supplied with the meter for providing a printed record of the distance measurement, as well as being fed to the switch 58 or the converter 128 as previously described. It may also be noted that when a single decade-counting unit 202 is provided, the meter 38 will provide a sum of the travel times of ten signals reflected by the desired target. If the average of a larger number of travel times is desired, an additional decade-counting unit 202 may be connected in series, and each additional decade-counting unit 202 added results in a multiplication of the number of travel times averaged by ten. In other words, when two of the decade-counting units 202 are connected in series, the meter will provide a sum of 100 travel times.

When the travel time of a single signal is desired, the various switches 208, 212, 214 and 216 are moved by a linkage indicated by the dashed line 218 to the X1 positions. With the modifications provided by the present system, resistors R220 and R222 are added as biasing resistors for an existing tube V209 in the meter to produce the same bias that the resistors R272 and R275 provide in the multiple count operation. Also, condenser C204 provides an A.C. bypass for the single count operation.

Figure 15:
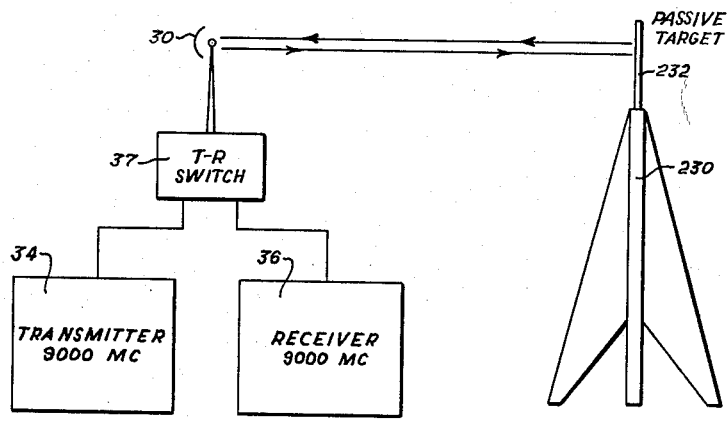
FIGURE 15 is a schematic illustration of one form of transmitting and reflecting system which may be used in the present invention.

In the embodiment described it has been assumed that the desired targets were passive-type targets which merely function to reflect signals transmitted by the antenna 30, with the targets preferably being shaped to reflect signals polarized in a given direction to assist in the distinguishing of the reflected signals from the desired and undesired targets. This type of operation is illustrated in FIG. 15 where both the transmitter 34 and the receiver 36 are adjusted to the same frequency. For example, the transmitter 34 may be set to feed signals of a frequency of 9000 mc. through the TR switch 37 to the antenna 30. In this event, the signals reflected by the targets to the antenna 30 will also have a frequency of 9000 mc. and these reflected signals are fed through the TR switch 37 to the receiver 36. It will then be apparent that the receiver 36 would also be set to receive only 9000 mc. signals, such that any noise which would be received by the antenna 30 would not provide an erroneous reading.

Figure 16:
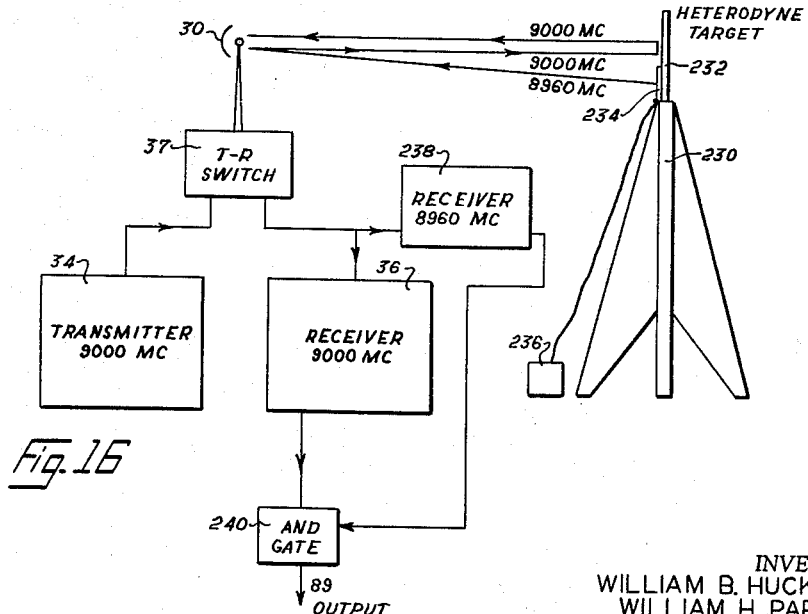
FIGURE 16 is a schematic illustration of an alternate transmitting and reflecting system of the heterodyne type.

In some areas, such as in localities where a large number of good reflecting, but undesired, targets are provided along the shoreline of the area to be surveyed, it is desirable to use a heterodyne-type of system as illustrated in the block diagram of FIG. 16. In this type of system, we provide a target 230 having a good reflecting surface 232 for reflecting signals transmitted from the antenna 30, along with an antenna 234 which will transmit a signal provided by a signal source 236. The signal source 236 may produce either a continuous wave or random pulses having a specific frequency for transmission by the antenna 234. When using the heterodyne target 230, a second receiver 238 is connected in parallel with the receiver 36, and the output of receiver 238 is connected to operate an AND gate 240 interposed in the output 89 of the receiver 36. In this system, the receiver 36 is set to receive only signals having a frequency equal to the frequency of the signals transmitted by transmitter 34, and the receiver 238 is set to receive only signals having a frequency equal to the frequency of signals transmitted by the transmitter 234. The frequency of signals transmitted by the transmitter 234 should be above or below the frequency of signals transmitted by transmitter 34 by an amount of at least the band widths of the receivers, but sufficiently close that the antenna 30 will operate efficiently on both frequencies. For example, the transmitter 34 may be set to transmit signals of 9000 mc. and the transmitter 234 may be set to transmit signals of 8960 mc. The receiver 36 would then be set to receive only those signals having a frequency of 9000 mc. and the receiver 238 is set to receive only signals of 8960 mc. Therefore, only when the antenna 30 is receiving both 9000 mc. and 8960 mc. signals will the AND gate 240 be open and receiver 36 function to generate stop pulses for the present system, such that no undesired targets can reflect the required frequencies to the antenna 30 and provide an erroneous reading. As will be understood by those skilled in the art, if receiver 36 is a superheterodyne receiver, two local oscillator signals can be generated to produce a unique beat frequency only when a 9000 mc. signal is received from the target and when an 8960 mc. signal is received from transmitter 234. This unique beat frequency would then be amplified and detected to produce the stop pulse through conductor 89. On the other hand, the receiver 36 can be made to operate as a superheterodyne receiver by simply using the signal from transmitter 234 as the "remote" local oscillator signal.

In those areas where power supply is a problem, we prefer to use a receiving and retransmitting system as illustrated in FIG. 17, rather than a heterodyne system. This receiving and transmitting system utilizes a receiver 242 at each target location connected to key or turn on a transmitter 244 when signals of a given frequency are received, with the transmitters 244 at the various target locations being set to transmit different frequencies. For example, if the transmitter 34 transmits signals of 9000 mc., the transmitter 244 at the red target may transmit signals of 8980 mc.; the transmitter 244 at the green target may transmit signals of 9020 mc., and the transmitter 244 at the yellow target may transmit signals of 9040 mc. It will also be understood that the receiver 36 on the surveying ship is adjustable to alternately receive signals of 8980, 9020 and 9040 mc. Adjustment or setting of the receiver 36 may be easily controlled automatically by signals from the azimuth selector switch contacts 85B, 86B and 87B. However, when the receiver 36 is not actuated by signals from any of the contacts 85B, 86B or 87B, then the receiver receives signals of 9000 mc. for operation of the PPI indicator 60 as a normal radar.

As previously described, the switch contacts 85B, 86B and 87B are closed when the antenna 30 is directed, respectively, at the red, green and yellow targets. Thus, when the antenna 30 sends a 9000 mc. signal toward the red target, the respective receiver 242 keys the respective transmitter 244 to transmit a signal of 8980 mc. Simultaneously, the signal fed from the switch contact 85B adjusts the receiver 36 to receive signals of 8980 mc., such that the receiver 36 will then send a stop pulse through conductor 89. As the antenna 30 sweeps past the green and yellow targets, the respective transmitters are energized and the receiver 36 is adjusted to operate in a similar manner. Thus, the transmitters 244 are operated only when the respective receivers 242 are receiving signals from the antenna 30 to provide a substantial power saving. It will also be noted that this system will eliminate operation of the receiver 36 in response to erroneous signals.

From the foregoing it will be apparent that the present invention provides a system for precisely determining the position of a station which may be located either on land, on water or in the air, and is particularly useful aboard a ship, such that the efficiency and accuracy of marine seismic surveys may be appreciably improved. The present system utilizes two known targets spaced at various directions and distances from the station and provides precise distance measurements of the station from each target, such that the precise position of the station may be determined. The present system also provides distance measurements between a third target and the transmitting station at at least two positions of the transmitting station, such that the third target can be plotted in and subsequently used for tracking the transmitting station. All signals reflected to the station caused by unknown or undesired targets are, in effect, ignored and cannot be used to provide erroneous readings by the positioning system. An appreciable portion of existing navigation equipment on a ship may be utilized to provide an economical system. It will also be apparent that the present invention provides a novel system and method for averaging a plurality of travel times to provide a precise time measurement. Finally, it will be apparent that the present invention is simple in construction, may be economically manufactured, and may be easily and economically operated.

Changes may be made in the combination and arrangement of parts or elements, as well as in the combination and arrangement of steps or procedures, as heretofore set forth in the specification and shown in the drawings, it being understood that changes may be made in the embodiments disclosed herein without departing from the spirit and scope of the invention as defined in the following claims.

We claim:

1. A system for determining the position of a station with respect to a pair of spaced targets, the combination of:
    (a) means including a display for determining the approximate range and direction of the targets from the station, and for indicating the proper adjustment of the system for enabling precise determination as to each of the targets,
    (b) means for alternately transmitting a series of pulse-type signals from the station towards each of the targets,
    (c) means for receiving those signals reflected to the station,
    (d) time-measuring means,
    (e) means for starting the time-measuring means during the transmission of each series of signals after receipt at the station of a predetermined number of reflected signals,
    (f) adjustable means for stopping the time-measuring means upon the receipt at the station of a reflected signal of the respective series of signals which arrives at the station at a time spaced from the respective starting of the time-measuring means corresponding to approximately twice the expected travel time of a signal between the station and the respective target, said adjustable means being connected to said display to indicate on said display the range, for each target, from which reflected signals are effective in stopping the time-measuring means as set by said adjustable means, and
    (g) means for registering the time measurements of the time-measuring means from which the precise position of the station with respect to the targets may be determined.

2. A system as defined in claim 1 wherein the time-measuring means is an electronic time interval meter having a reset circuit, and said means for starting the time-measuring means includes a reset generator for generating a reset signal when a series of signals are being transmitted toward each of the targets, an AND gate connected to receive and pass reflected signals, means connecting the reset generator to the AND gate for opening the AND gate only when the AND gate is receiving a reset signal, preset counter means connected to receive signals from the AND gate and pass a reflected signal therethrough after receipt of a predetermined number of reflected signals, and means connecting the preset counter means to the time interval meter reset circuit, whereby the time interval meter is reset to start counting after receipt at the station of a predetermined number of signals reflected from the target toward which signals are being transmitted.

3. A system for determining the position of a mobile station with respect to a pair of spaced targets, the combination of:
    (a) a rotary-type directional antenna mounted at the station,
    (b) drive means for turning the antenna in a circle in a position to alternately scan the targets,
    (c) pulse-type signal-transmitting means,
    (d) signal-receiving means,
    (e) a TR switch connecting the transmitting means and receiving means to the antenna for transmitting a pulse-type signal from the antenna and, alternately, receiving signals reflected back to the antenna,
    (f) electronic time-measuring means responsive to start and stop pulses for measuring the time therebetween and having a reset circuit, said time-measuring means being characterized by being capable of holding a total count after receiving a stop pulse and not being responsive to subsequent start and stop pulses until reset,
    (g) means for sending a start pulse to the time-measuring means each time a signal is transmitted from said transmitting means through the antenna,
    (h) an adjustable range control means connected to said transmitting and receiving means and to the time-measuring means and responsive to said start pulses and reflected signals for sending a stop pulse to the time-measuring means each time a reflected signal is received at a time interval after the occurrence of a start pulse which is substantially equal to the expected travel time of a signal reflected by either of the targets,
    (i) selector means connected to said drive means for energizing the range control means only when the antenna is directed toward one of said targets,
    (j) a reset generator connected to receive stop pulses, and being connected to said selector means and the reset circuit of the time-measuring means for resetting the time-measuring means only when the antenna is directed toward either of said targets and only after a predetermined number of stop pulses have been generated, and
    (k) means for registering said time measurements, from which the distance of the station from the targets may be determined.

4. A system for determining the position of a mobile station with respect to a pair of spaced targets, the combination of:
    (a) a rotary-type directional antenna mounted at the station,
    (b) drive means for turning the antenna in a circle in a position to alternately scan the targets,
    (c) pulse-type signal-transmitting means,
    (d) signal-receiving means,
    (e) a TR switch connecting the transmitting means and receiving means to the antenna for transmitting a pulse-type signal from the antenna and, alternately, receiving signals reflected back to the antenna,
    (f) electronic time-measuring means responsive to start and stop pulses for measuring the time therebetween and having a reset circuit, said time-measuring means being characterized by being capable of holding a total count after receiving a stop pulse and not being responsive to subsequent start and stop pulses until reset,
    (g) means for sending a start pulse to the time-measuring means each time a signal is transmitted from said transmitting means through the antenna,
    (h) an adjustable range control means connected to said transmitting and receiving means and to the time-measuring means and responsive to said start pulses and reflected signals for sending a stop pulse to the time-measuring means each time a reflected signal is received at a time interval after the occurrence of a start pulse which is substantially equal to the expected travel time of a signal reflected by either of the targets, (i) selector means connected to said drive means for energizing the range control means only when the antenna is moved through a predetermined arc including one or the other of said targets, (j) a reset generator connected to said selector means and the reset circuit of the time-measuring means for resetting the time-measuring means each time the antenna is directed at either of the targets, and (k) means for registering said time measurements, from which the distance of the station from the targets may be determined.

5. A system as defined in claim 4 wherein said selector means includes adjustable bearing means for controlling the energizing of the range control means as the direction of the targets from the station changes, and including means for adjusting the width of said arc.

6. A system as defined in claim 5 wherein said adjustable bearing means includes means producing an A.C. signal correlated with the speed of rotation of the antenna, and an adjustable control transformer for each target connected to receive said A.C. signal and produce an output A.C. signal having nulls coresponding to the times when the antenna is directed at the respective target.

7. A system as defined in claim 6 wherein each of said selector means includes a selector switch, relay means operatively connected to the selector switch, a multivibrator connected to the respective control transformer for energizing the relay means in accordance with said output A.C. signal, and wherein said means for adjusting the width of said arc comprises a variable resistance interposed in the connection of the multivibrator to the control transformer to control the amplitude of the signal fed to the multivibrator and control the times of actuation of said selector switch.

8. A system for tracking a mobile station wherein the area being traversed contains a series of targets and the positions of two targets are known, the combination of:

(a) means including a display for determining the approximate ranges and directions of the two known targets and a third target from the station, and for indicating the proper adjustment of the system for enabling precise determination as to each of the targets, (b) means for alternately transmitting a series of pulse-type signals from the station toward each of the known and the third target, (c) means for receiving those signals reflected to the station, (d) time-measuring means, (e) means for starting the time-measuring means simultaneously with the transmission of one of said signals of each series from the station, (f) adjustable means for stopping the time-measuring means upon the receipt at the station of a reflected signal of the respective series of signals which arrives at the station at a time spaced from the respective starting of the time-measuring means corresponding to approximately twice the expected travel time of a signal between the station and the respective target, said adjustable means being connected to said display to indicate on said display the range, for each target, from which reflected signals are effective in stopping the time-measuring means as set by said adjustable means, and (g) means for registering the time measurements of the time-measuring means from which the precise position of the station with respect to the known targets may be determined and from which the precise position of the third target may be found, whereby the third target may be subsequently used with one of said known targets for tracking the station.

9. A system for determining the position of a station with respect to a pair of spaced targets, the combination of:

(a) means including a display for determining the approximate range and direction of the targets from the station, and for indicating the proper adjustment of the system for enabling precise determination as to each of the targets, (b) means for alternately transmitting a series of pulse-type signals from the station towards each of the targets, (c) means for receiving those signals reflected to the station, (d) time-measuring means responsive to start and stop pulses for producing an output signal digitally representative of the time between receipt of a start pulse and a stop pulse by the time-measuring means, (e) means for feeding a start pulse to the time-measuring means simultaneously with the transmission of one signal of each series of signals from the station, (f) adjustable means for feeding a stop pulse to the time-measuring means upon the receipt at the station of a reflected signal of the respective series of signals which arrives at the station at a time spaced from the respective starting of the time-measuring means corresponding to approximately twice the expected travel time of a signal between the station and the respective target, said adjustable means being connected to said display to indicate on said display the range, for each target, from which reflected signals are effective in stopping the time-measuring means as set by said adjustable means, (g) registering means responsive to the output signals from the time-measuring means for indicating the distances of the station from the targets, and (h) means for preventing transmission of an output signal to the registering means which varies more than a predetermined maximum from the immediately preceding output signal associated with the respective target, to prevent registering spurious distance measurements.

10. A system as defined in claim 9 wherein a separate registering means is provided for each of the targets, said means for preventing transmission of an output signal to the registering means includes a digital storage device for each registering means, and a coincidence gate connected between each digital storage device and the respective registering means and controlled by the respective digital storage device and registering means.

11. A system for determining the position of a mobile station, the combination of:

(a) a pair of spaced target means responsive to a first pulse-type signal of one frequency for simultaneously transmitting a second pulse-type signal of a different frequency, (b) means including a display for determining the approximate range and direction of the target means from the station, and for indicating the proper adjustment of the system for enabling precise determination as to each of the targets, (c) means for alternately transmitting a series of pulse-type signals of said one frequency from the station towards each of the target means, (d) means at the station for receiving only those signals transmitted by the target means, (e) time-measuring means, (f) means for starting the time-measuring means simultaneously with the transmission from the station of one signal of each of said series of signals, (g) adjustable means for stopping the time-measuring means upon receipt at the station of a signal from the respective target means which arrives at the station at a time spaced from the respective starting of the time-measuring means corresponding to approximately twice the expected travel time of a signal between the station and the respective target, said adjustable means being connected to said display to indicate on said display the range, for each target, from which reflected signals are effective in stopping the time-measuring means as set by said adjustable means, and (h) means for registering the time measurements of the time-measuring means, from which the precise position of the station with respect to the targets may be determined.

12. A system as defined in claim 11 wherein said target means transmit different frequency signals.

References Cited by the Examiner

UNITED STATES PATENTS

| | | | |
|---|---|---|---|
| 2,422,697 | 6/47 | Meacham | 343—5 |
| 2,702,367 | 2/55 | Ergen | 343—13 |
| 3,015,817 | 1/62 | Pastoriza | 343—7.3 |
| 3,075,189 | 1/63 | Lisicky | 343—7.3 |

CHESTER L. JUSTUS, *Primary Examiner.*